US011987083B2

(12) United States Patent
Baek (10) Patent No.: US 11,987,083 B2
(45) Date of Patent: May 21, 2024

(54) APPARATUS FOR ATTACHING OR DETACHING COMMERCIAL VEHICLE TIRE HUB DRUM

(71) Applicant: Seong Gi Baek, Seoul (KR)

(72) Inventor: Seong Gi Baek, Seoul (KR)

( * ) Notice: Subject to any disclaimer, the term of this patent is extended or adjusted under 35 U.S.C. 154(b) by 18 days.

(21) Appl. No.: 17/623,696

(22) PCT Filed: Jul. 6, 2020

(86) PCT No.: PCT/KR2020/008819
§ 371 (c)(1),
(2) Date: Dec. 29, 2021

(87) PCT Pub. No.: WO2021/015448
PCT Pub. Date: Jan. 28, 2021

(65) Prior Publication Data
US 2022/0274453 A1 Sep. 1, 2022

(30) Foreign Application Priority Data
Jul. 19, 2019 (KR) .......................... 10-2019-0087867

(51) Int. Cl.
*B60C 25/05* (2006.01)
*B60B 30/02* (2006.01)
*B60B 30/08* (2006.01)
*B60B 30/06* (2006.01)
*B60B 30/10* (2006.01)

(52) U.S. Cl.
CPC .......... *B60C 25/0521* (2013.01); *B60B 30/02* (2013.01); *B60B 30/08* (2013.01); *B60C 25/0527* (2013.01); *B60C 25/0563* (2013.01); *B60B 30/06* (2013.01); *B60B 30/10* (2013.01)

(58) Field of Classification Search
CPC ............ B60C 25/0521; B60C 25/0563; B60C 25/0527; B60B 30/02; B60B 30/08; B60B 30/06; B60B 30/10
See application file for complete search history.

(56) References Cited

FOREIGN PATENT DOCUMENTS

| JP | S6146400 B2 * | 10/1986 | ............ C21D 6/004 |
|---|---|---|---|
| JP | H06-143906 A | 5/1994 | |
| JP | 6108712 B2 | 4/2017 | |
| KR | 10-0317200 B1 | 12/2001 | |
| KR | 10-0600999 B1 | 7/2006 | |
| KR | 10-2010-0061593 A | 6/2010 | |
| KR | 10-2036482 B1 | 11/2019 | |

* cited by examiner

*Primary Examiner* — Ryan J. Walters
(74) *Attorney, Agent, or Firm* — Maschoff Brennan (57) ABSTRACT

An apparatus enables a commercial vehicle tire hub drum to be attached and detached. The apparatus includes a main body frame having traveling wheels mounted on a lower part thereof and holding means that face forward from the main body frame for holding upright a circular load mounted on a commercial vehicle. An attachment/detachment means executes an attachment/detachment operation of the load from above the holding means. A position adjustment device coupled to the main body frame adjusts the position of the holding means and the attachment/detachment means. Accordingly, the apparatus uses a hydraulic device providing a hydraulic driving force to conveniently attach or detach a load of various sizes to a vehicle from a fixed position while simultaneously adjusting the vertical position of a load-holding means.

17 Claims, 8 Drawing Sheets

APPARATUS FOR ATTACHING OR DETACHING COMMERCIAL VEHICLE TIRE HUB DRUM

TECHNICAL FIELD

The present invention relates to an apparatus for attaching or detaching a commercial vehicle tire hub drum, and more particularly, to an apparatus for attaching or detaching a commercial vehicle tire hub drum to easily attach and detach a commercial vehicle tires having various sizes, and a hub and drum mounted on a commercial vehicle in place, and enable the transport of a large tire within a short-distance workplace, thereby improving work efficiency, and enabling simple operation for easy use.

BACKGROUND ART

In general, since it is difficult for even strong worker to support and withstand a large tire having heavy weight in the process of replacing large tires for commercial vehicles, there is always a risk of an accident that may inflict damage to the body during the work process.

In addition, because two or three workers are always required accordingly, the productivity and the work efficiency are reduced upon replacement work of a tire.

In order to solve the above problems, the related art Korean Patent Registration No. 0317200 discloses "Tire Mounting Device".

However, when a large tire is replaced using the "tire mounting device" according to the related art a wire may be cut due to the weight of the large tire in the process of lifting with the tire while being held, thereby causing an accident.

In addition, since there is no position adjusting means and pressurizing means, other than lifting the large tire using the wire, for precisely adjusting a position in a correct position while lifting the large tire in order to attach or detach the large tire to or from a hub of a vehicle axle, workers are additionally required or work time is delayed for a long time upon replacement of a hub and a drum as well as replacement of a tire.

Accordingly, there is an urgent need for a realistic and applicable technology with respect to a detachable device. to adjust a position of a vehicle hub and a drum as well as a large tire so as to be placed in a replaceable position and easily attached and detached with pressurization, and prevent an accident.

DISCLOSURE

Technical Problem

The present invention is provided in order to solve the above problems. an object of the present invention is to provide an apparatus for attaching or detaching a commercial vehicle tire hub drum, which enables adjusting the vertical position of the forklift fork by using a hydraulic device for providing a hydraulic driving force, and easily attaching and detaching large tires for cargo trucks, and vehicle hubs and drums of various sizes in place.

In addition, an object of the present invention is to provide an apparatus for attaching or detaching a commercial vehicle tire hub drum, in which the heavy weight related to large tires mounted on commercial vehicles can be easily replaced, and short-distance transport can be facilitated within a workplace, so that the work efficiency can be improved.

Technical Solution

The apparatus for attaching or detaching a commercial vehicle tire hub drum according to the embodiments of the present invention may include: a main body frame (100) having traveling wheels (110) mounted on a lower part thereof; a holding means (200) formed so as to face forward from the main body frame (100) for holding upright a circular load mounted on a commercial vehicle; an attachment/detachment means (300) for executing an attachment/detachment operation of the load from above the holding means (200); and a position adjustment device (400) coupled to the main body frame (100) to adjust positions of the holding means (200) and the attachment/detachment means (300).

The main body frame (100) may be formed on an upper rear surface t hereof with an operation lever (120) for controlling operations of the position adjustment device (400) and the attachment/detachment means (300), and m ay be formed on a side surface thereof with a driving unit (130) for driving the position adjustment device (400) and the attachment/detachment means (300) by controlling the operation lever (120).

The main body frame (100) may be provided with a main frame (101) providing a moving space of a position adjustment device (410) for perform in g an elevating operation of the holding means (200); and at least one sub-frame (102) providing a moving space of a position adjustment device (420) for performing an elevating operation of the attachment/detachment means (300), and having a lower side to which the holding means (200) bent in an 'L' shape is coupled.

The main body frame (100) may be further provided with a connection frame (103) connected and fixed to a predetermined portion of the holding means (200) coupled to the sub-frame (102) and predetermined portions of the position adjustment devices (410, 420) for performing the elevating operation of the sub-frame (102).

The sub-frame (102) may be provided therein with a fixing frame (104) for supporting and fixing the attachment/detachment means (300).

The position adjustment device (400) may include bidirectional double-acting cylinder type hydraulic cylinders (411, 421) vertically coupled to the main body frame (100) in a reverse structure in which a piston contracts down ward to adjust positions of the holding means (200) and the attachment/detachment means (300).

The position adjustment device (400) may be provided with a first posit ion adjustment device (410) coupled to the main frame (101) constituting the main body frame (100) in a hydraulic cylinder manner in order to adjust a position of the holding means (200); and a second position adjustment device (420) coupled to the sub-frame (102) constituting the main body frame (100) in a hydraulic cylinder manner in order to adjust a position of the attachment/detachment means (300).

The first position adjustment device (410) may be provided with a pair of first hydraulic cylinders (411) formed perpendicular to the main frame in a reverse structure in which a piston rod (411a) contracts downward in order to perform an elevating operation of the holding means (200); a pair of first transfer plates (412) for vertically and linearly reciprocating along both sides of the main frame (101) while one end of the piston rod constituting the first hydraulic cylinder (411) and a part of the connection frame (103) fixed to the holding means (200) are fixedly coupled; and a plurality of first transfer rollers (413) rotatably coupled to both upper and lower sides of one side surface of the first transfer plate (412) to move up and down along a vertical transfer rail (101a) having a 'C' shape in a horizontal section and formed on both sides of the main frame when the piston rod (411a) of the hydraulic cylinder (411) contracts.

the second position adjustment device (420) may be provided with a p air of second hydraulic cylinders (421) formed perpendicular to the sub-frame (102) in a reverse structure in which a piston rod (421a) contracts downward in order to perform an elevating operation of the attachment/ detachment means (300); a pair of second transfer plates (422) for vertically and linearly reciprocating along both sides of the sub-frame (102) while one end of the piston rod (421a) constituting the second hydraulic cylinder (412) and a part of the fixing member for supporting and fixing the attachment/detachment means (300) are fixedly coupled; and a plurality of second transfer rollers (423) rotatably coupled to both upper and lower sides of one side surface of the second transfer plate (422) to move up and down along a vertical transfer rail (102a) having a 'C' shape in a horizontal section and formed on both sides of the sub-frame (102) when the piston rod (421a) of the second hydraulic cylinder (421) contracts.

The first and second hydraulic cylinders (411 and 421) may be installed with a pair of hydraulic ports (411b, 421b) in adjacent portions of both ends of a cylinder housing (411) constituting the hydraulic cylinder and may be for med in a double-acting cylinder type in which an inner center of the cylinder housing is partitioned by a partition wall, so as to move up and down.

The attachment/detachment means (300) may be provided with a wheel fixing means (301) having at least two wheel vent clasps (301a) for fixing a circular heavy object; and a press arm member (310) for separating the fixed circular heavy object from a vehicle by pressing a portion separated from the circular heavy object.

The press arm member (310) may be provided with a cylindrical hydraulic press housing (311) operated in a double-acting cylinder manner in which a pair of hydraulic ports (311a) are installed in portions adjacent to both front and rear ends thereof and a partition is installed in a center thereof; a fixing member (312) supporting and fixing the sub-frame (102) while surrounding a periphery of the hydraulic press housing (311); and a hydraulic press piston rod (313) for attaching and detaching the circular heavy object to or from the vehicle when oil is introduced through the hydraulic port (311a) installed in the hydraulic press housing (311).

The traveling wheels (110) mounted on the lower part of the main body frame may have a pair of fixed wheels (111), which are difficult to change directions, in front sides, and may have a pair of rotating wheels (112), which a re easy to change directions, in rear sides.

The holding means (200) may be formed as forks for a forklift in which forks facing each other are inclined, so that the circular heavy object can be stably mounted.

The main body frame (100) may have an accelerator pedal (120) installed to protrude from a bottom of a rear end of the main body frame to accelerate the power of the driving unit.

The main frame (101) and the sub-frame (102) constituting the main body frame (100) may be formed as a frame having a rectangular ring shape in order to provide a space for expansion and contraction of the piston rods (411a, 421a) constituting the hydraulic cylinders (411, 421), and the size of the frame may be adjusted to replace circular heavy objects of various sizes.

The apparatus for attaching or detaching a commercial vehicle tire hub drum for attaching and detaching a circular heavy object mounted on a commercial vehicle according to the embodiments of the present invention may include: a main frame (101) formed on an upper rear surface thereof with an operation lever (120) for controlling attachment/ detachment operations, and pro vided on an outer side surface thereof with a hydraulic driving device (130) for providing a hydraulic driving force under the control of the operation lever (120); a sub-frame (102) disposed in a vertical direction to enable elevating and lowering operations in front of the main frame (101) while the holding means (200) bent in an 'L' shape is fixedly coupled on a lower side; an attachment/detachment means (300) installed to move up and down at a center in the inner horizontal direction of the sub-frame (102) to directly perform an attachment and detachment operations in close contact with a separated center of a tire wheel of the vehicle with respect to the circular heavy object; and a traveling unit (110) mounted on a lower part of the main frame (101) and including a moving means for enabling short-distance movement.

The main frame (101) may include a pair of first hydraulic cylinders (411) mounted in a reverse structure, in which the piston rod (411a) contracts downward in order to perform the lifting and lowering operation of the sub-frame (102) coupled to the holding means (200), and having a bidirectional double-acting cylinder type; a pair of first transfer plates (412) for vertically and linearly reciprocating along both sides of the main frame (101) while having a rod fixing part (411d) to which one end of the piston rod (411a) constituting each of the first hydraulic cylinders (411) is fixedly coupled; and a plurality of first transfer rollers (413) in-situ rotatably coupled to both upper and lower sides of one side surface of the first transfer plate (412) to move up and down along a vertical transfer rail (101a) formed on both sides of the main frame (101) when the piston rod (411a) of the first hydraulic cylinder (411) contracts.

The sub-frame (102) may include a pair of second hydraulic cylinders (421) mounted in a reverse structure in which the piston rod (421a) contracts downward in order to perform an elevating operation of the attachment/detachment means (300), and having a bidirectional double-acting cylinder type; a pair of second transfer plates (423) for vertically and linearly reciprocating along both sides of the sub-frame (102) while one end of the piston rod (421a) constituting each of the second hydraulic cylinders (412) and both ends of the fixing member (312) constituting the attachment/detachment means (300) and supporting and fixing the attachment/detachment means so as to be positioned at a center in the horizontal direction are fixedly coupled; and a plurality of second transfer rollers (423) in-situ rotatably coupled to both upper and lower sides of one side surface of the second transfer plate (423) to move up and down along a vertical transfer rail (102a) formed on both sides of the sub-frame (102) when the piston rod of the second hydraulic cylinder (421) contracts.

The attachment/detachment means (300) may include a press arm member (310) in which the piston rods (411a, 421a) expand and contract in the horizontal direction when oil is selectively introduced into the hydraulic ports (411b, 421b) formed on both sides of the cylinder housings (411, 421) having a bidirectional double-acting cylinder type so as to press or release a portion separated from the circular heavy object; and a wheel fixing means (301) for coupling and fixing the circular heavy object so as to separate the fixed circular heavy object from the vehicle when the portion separated from the circular heavy object is pressed by using the press arm member (310).

Advantageous Effects

As described above, The present invention provides an apparatus for attaching or detaching a commercial vehicle tire hub drum, which can use a hydraulic device providing a hydraulic driving force to adjust the vertical position of a load-holding means, and conveniently attach or detach a load of various sizes to a vehicle from a fixed position.

In addition, the present invention provides an apparatus for attaching or detaching a commercial vehicle tire hub drum, in which large tires as well as vehicle hubs, drums, and combinations thereof can be easily replaced, and short-distance transport can be facilitated within a workplace, so that the work efficiency can be improved.

In addition, according to the present invention, elevating heights of the forklift fork and the press arm member can be adjusted independently of each other by composing the main body frame in multiple, so that tires for large trucks of various sizes can be easily attached and detached.

In addition, the present invention provides an apparatus for attaching or detaching a commercial vehicle tire hub drum, in which the sufficient physical force can be provided to attach and detach the heavy object by using the hydraulic cylinder and the hydraulic press operated in a bidirectional double-acting cylinder type using a pair of hydraulic ports installed on both sides of the housing in the longitudinal direction, so that anyone can easily operate the apparatus without much effort.

In addition, according to the present invention, the piston rod of the hydraulic cylinder having a reverse contraction structure and installed on the main body frame is provided to contract downward, so that the minimum height for mounting the heavy object mounted on the vehicle can be easily ensured.

In addition, according to the present invention, the heavy object can be stably raised and lowered by using a structure using the transfer rollers inserted into both side surfaces of the main frame and the sub-frame constituting the main body frame and moved while coming into contact with the inner side of the frame, and a plurality of transfer plates vertically transferred along the both side surfaces constituting the main body frame, so that an accident can be effectively prevented.

In addition, according to the present invention, the traveling wheels mounted on the lower part of the main body frame is provided such that a pair of fixed wheels are provided in front sides so as to be difficult to change directions, and a pair of rotating wheels are provided in rear sides so as to be easily change directions, so that the direction change can be facilitated during short-distance transfer while being close to the axle hub, and can be moved while securing a proper position upon attachment and detachment.

BEST MODE

Mode for Invention

The apparatus for attaching or detaching a commercial vehicle tire hub drum according to the present invention may include a main frame 101 formed on an upper rear surface thereof with an operation lever 120 for controlling attachment/detachment operations, and provided on an outer side surface thereof with a hydraulic driving device 130 for providing a hydraulic driving force under the control of the operation lever 120; a sub-frame 102 disposed in a vertical direction to enable elevating and lowering operations in front of the main frame 101 while the forklift fork 200 bent in an 'L' shape is fixedly coupled on a lower side; a press arm member 310 installed to move up and down at a center in the inner horizontal direction of the sub-frame 102 to press a central hub of the tire wheel of the vehicle; a position adjustment device 400 receiving the hydraulic pressure of the hydraulic driving device 130 to perform the lifting and lowering operation of the sub-frame 102 and the press arm member 310 in a bidirectional double-acting cylinder type; and traveling wheels 110 mounted on a lower portion of the main frame 101 and formed as a moving means.

The position adjustment device 400 may include a first position adjustment device 410 having a first hydraulic cylinder 411 having a reverse structure in which the piston rod 411a contracts downward to adjust the height of the forklift fork 200 and coupled to the main frame 101; and a second positioning device 420 having a second hydraulic cylinder 421 having a reverse structure in which the piston rod 421a contracts downward to adjust the height of the press arm member 310 and coupled to the sub-frame 102.

The first position adjustment device 410 constituting the position adjustment device may include a pair of first transfer plates 412 for vertically and linearly reciprocating along both sides of the main frame 101 while one end of the piston rod 411a constituting each of the first hydraulic cylinders 411 is fixedly coupled; and a plurality of first transfer rollers 413 in-situ rotatably coupled to both upper and lower sides of one side surface of the first transfer plate 412 to move up and down along a vertical transfer rail 101a formed on both sides of the main frame 101 when the piston rod 411a of the first hydraulic cylinder 411 contracts.

The second position adjustment device 420 constituting the position adjustment device 400 may include a pair of second transfer plates 422 for vertically and linearly reciprocating along both sides of the sub-frame 102 while one end of the piston rod 421a constituting each of the second hydraulic cylinders 412 and both ends of the fixing member 312 constituting the attachment/detachment means 300 and supporting and fixing the attachment/detachment means so as to be positioned at a center in the horizontal direction are fixedly coupled; and a plurality of second transfer rollers 423 in-situ rotatably coupled to both upper and lower sides of one side surface of the second transfer plate 422 to move up and down along a vertical transfer rail 102a formed on both sides of the sub-frame 102 when the piston rod 421a of the second hydraulic cylinder 421 contracts.

Each of the mainframe 101 and the sub-frame 102 may be formed in a rectangular ring shape in order to provide a space for expansion and contraction of the piston rods 411a, 421a constituting the hydraulic cylinders 411 and 421 of the position adjustment device 400, and the size of the frame may be adjusted to replace vehicle wheels of various sizes.

The sub-frame 102 may further include a connection frame 103 connected and fixed to the position adjustment device 400 for performing the elevating operation of the sub-frame 102.

The connection frame 103 may have a predetermined portion protruding to the outside of the sub-frame 102 so as to be caught on the lower portion of the main body frame 100 when the forklift fork 200 coupled to the lower side of the sub-frame 102 descends to a specific height.

Each of the mainframe 101 and the sub-frame 102 may be formed of a solid metal material that is not broken even when a large tire weighing hundreds of kg is loaded.

The main frame 101 may have an accelerator pedal 140 installed to protrude from a bottom of a rear end of the main body frame to accelerate the power of the hydraulic driving device.

The apparatus for attaching or detaching a commercial vehicle tire hub drum according to the embodiments of the present invention can replace large tires of various sizes by adjusting sizes of the main frame 101 and the sub-frame 102.

The apparatus for attaching or detaching a commercial vehicle tire hub drum according to the embodiments of the present invention may further include a wheel fixing means 301 for coupling and fixing the tire wheels constituting the vehicle wheels, so that the vehicle wheels can be separated from the vehicle when the central hub of the tire wheel is pressed using the press arm member 310.

The sub-frame 102 may be provided therein with a fixing frame 104 for supporting and fixing the attachment/detachment means 300.

The press arm member 310 may include a cylindrical hydraulic press housing 311 operated in a double-acting cylinder manner in which a pair of hydraulic ports 311a are installed in portions adjacent to both front and rear ends thereof and a partition is installed in a center thereof; a fixing member 312 supporting and fixing the hydraulic press housing 311 while surrounding the hydraulic press housing 311; and a hydraulic press piston rod 313 for attaching and detaching the tire wheel constituting the vehicle wheel to or from the vehicle when oil is introduced through the hydraulic port 311a installed in the hydraulic press housing 311.

The traveling wheels 110 may have a pair of fixed wheels 111, which are difficult to change directions, in front sides, and may have rotating wheels 112, which are easy to change directions, in rear sides.

Hereinafter, embodiments of the present invention will be described in detail with reference to the accompanying drawings.

Figure 1:
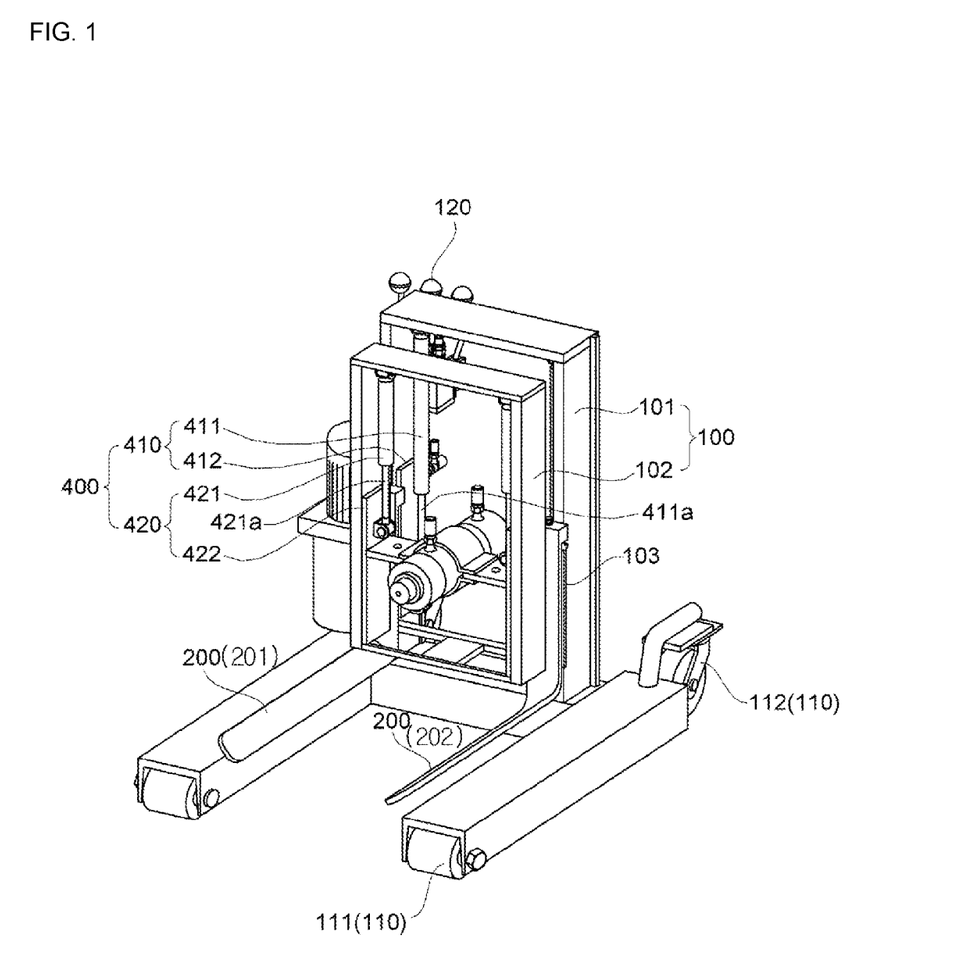
FIG. 1 is a view schematically showing the overall configuration of an apparatus for attaching or detaching a commercial vehicle tire hub drum according to the embodiments of the present invention.
Figure 2:
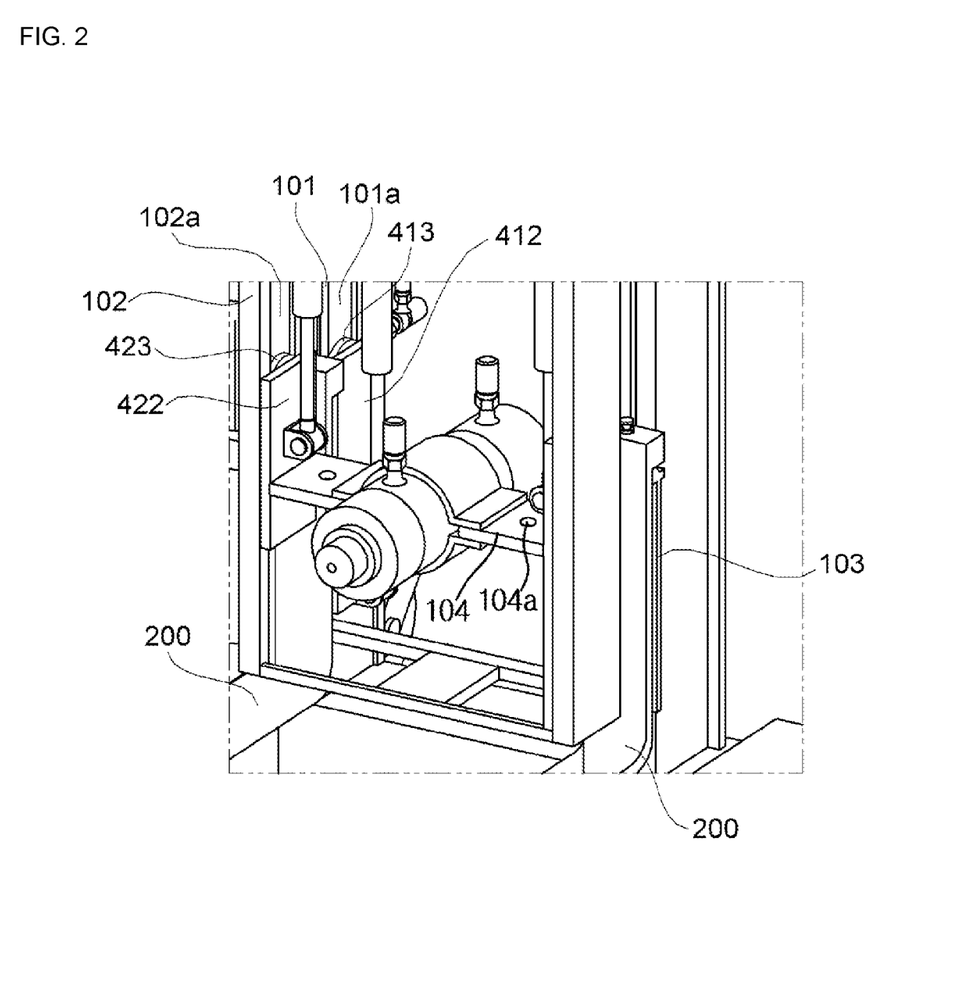
FIG. 2 is a view for explaining the detailed configuration of the main body frame shown in FIG. 1.

FIG. 1 is a view schematically showing the overall configuration of the apparatus for attaching or detaching a commercial vehicle tire hub drum according to the embodiments of the present invention. FIG. 2 is a view for explaining a main body frame shown in FIG. 1.

As shown in the drawing, the apparatus for attaching or detaching a commercial vehicle tire hub drum according to the embodiments of the present invention may include a main body frame 100, a holding means 200, an attachment/detachment means 300, and a position adjustment device 400.

More specifically, the main body frame 100 may have traveling wheels 110 mounted on a lower part thereof, may be formed on an upper rear surface thereof with an operation lever 120 for controlling operations of the position adjustment device 400 and the attachment/detachment means 300, and may be formed on a side surface thereof with a driving unit 130 for driving the position adjustment device 400 and the attachment/detachment means 300 by controlling the operation lever 120.

The main body frame 100 may include a main frame 101 and a sub-frame 102 as shown in the drawing.

More particularly, the main frame 101 may provide a moving space of a position adjustment device 410 for performing an elevating operation of the holding means 200, and include a traveling unit 110 positioned at the lower part, and the body may be formed in a ring shape of a rectangular shape when viewed from the front side.

In addition, the sub-frame 102 may be formed in a rectangular ring shape corresponding to the shape of the main frame 101 to provide a moving space of a position adjustment device 420 for performing an elevating operation of the attachment/detachment means 300, and disposed in front of the main frame 101, and a forklift fork bent in an 'L' shape may be coupled on a lower side as a holding means 200 according to the embodiments of the present invention.

The sub-frame 102 may be provided therein with a fixing frame 104 for supporting and fixing the attachment/detachment means 300.

In the embodiment of the present invention, the holding means 200 has the same configuration as the forklift fork, and the forklift fork described in the detailed description below is used as a holding device for holding vehicle wheels in the same way as the holding means.

In addition, the sub-frame 102 has been implemented as a single sub-frame in the embodiment of the present invention, however, at least one or more sub-frames may be provided according to the size of the tire. The sub-frame 102 installed with the attachment/detachment means 300 thereto is may be disposed at the forefront, and the remaining sub-frames may be used as an intermediary frame interworked with the main frame 101 so as to be elevated and lowered in a multi-stage structure.

Further, the main body frame 100 constituting the apparatus for attaching or detaching a commercial vehicle tire hub drum according to the embodiments of the present invention may further include a connection frame 103 connected and fixed to a predetermined portion of the forklift fork 200 coupled to the sub-frame 102 and a predetermined portion of the position adjustment device 410 and 420 for performing the elevating operation of the sub-frame 102.

Although not shown in the drawings, the connection frame 103 may be formed to protrude to the outside of the sub-frame 102 to prevent the forklift fork 200 from touching the floor upon descending operation, and may be formed to be caught on a main body of the traveling unit 110 constituting the lower part of the main body frame 100 when descending to a specific height.

In addition, in the embodiment of the present invention, the forklift fork 200 is formed to face forward from the main body frame 100 to hold the vehicle wheel upwards. The forks 201 and 202 constituting the forklift fork 200 may be formed in a structure of facing each other slantingly to stably hold a large tire for a truck, in which the inclination angle may be formed with a slope of 0 degree to 45 degrees.

The fork 200 for the forklift and the main body frame 100 may be formed of a solid metal material that is not broken even when a large tire weighing hundreds of kg is loaded.

In addition, the attachment/detachment means 300 may come into close contact with a central hub of the tire wheel of the vehicle from a position above the forklift fork 200, thereby performing the attachment and detachment operation of the vehicle wheel.

The attachment/detachment means 300 will be described in detail with reference to FIGS. 5 to 6 described later.

In addition, the position adjustment device 400 may be coupled to the main body frame 100 to adjust positions of the forklift fork 200 and the attachment/detachment means 300.

Figure 3:
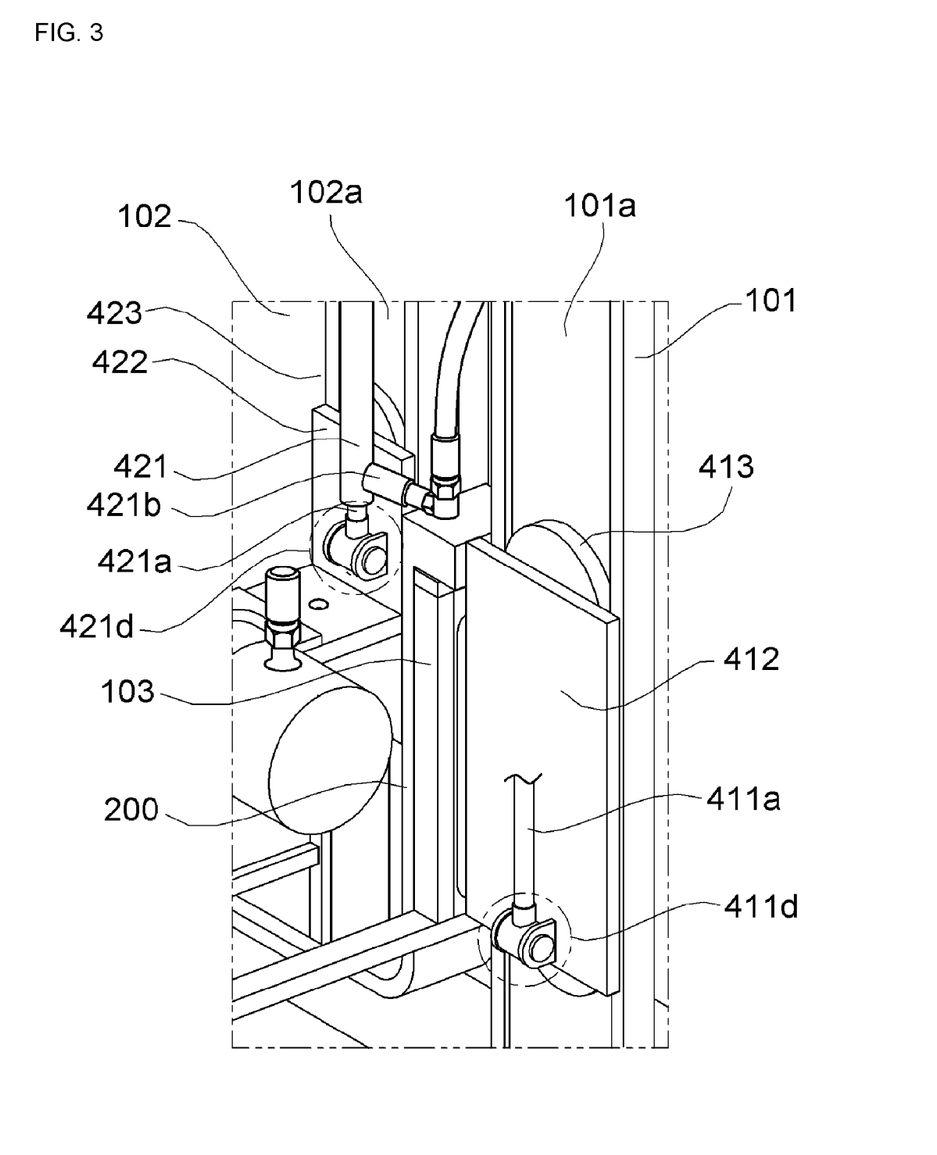
FIGS. 3 to 4 are views for explaining a position adjustment device according to the embodiments of the present invention.
Figure 4:
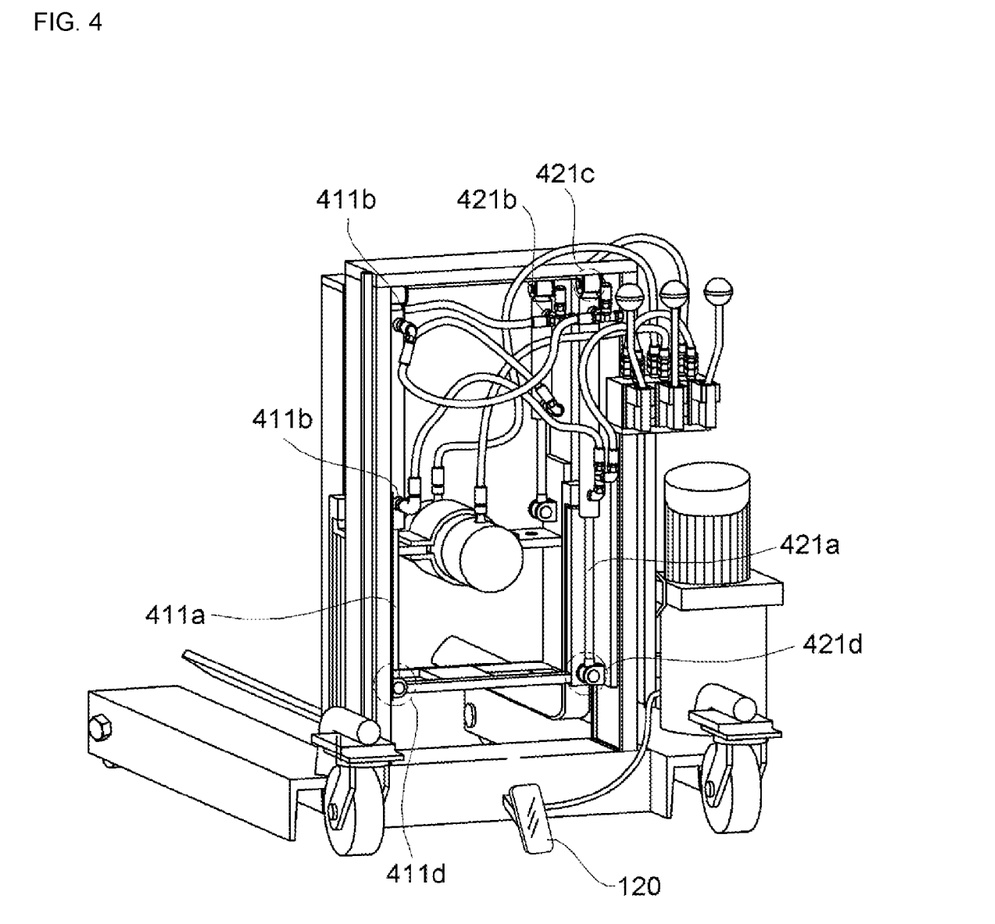

FIGS. 3 to 4 are views for explaining a position adjustment device according to the embodiments of the present invention.

The position adjustment device 400 according to the embodiments of the present invention will be described as follows with reference to the drawings.

As shown in the drawing, the position adjustment device 400 according to the embodiments of the present invention may include bidirectional double-acting cylinder type hydraulic cylinders 411, 421 vertically coupled to the main body frame 100 in a reverse structure in which a piston contracts downward in order to adjust the positions of the forklift fork 200 and the attachment/detachment means 300 described above.

The hydraulic cylinders 411 and 421 are formed in the reverse direction in which the piston contracts downward, and this is because the height of the attachment/detachment means can be adjusted so as to be adjacent to the ground in response to the height of the axle hub for attaching and detaching the large tire.

In addition, the double-acting cylinder type, in which bidirectional hydraulic ports are formed in the housing constituting the hydraulic cylinder, is used, so that the height of the forklift fork 200 and the attachment/detachment means 300 can be easily adjusted compared to the single-acting cylinder.

in the embodiment of the present invention, the position adjustment device 400 may include a first position adjustment device 410 and a second position adjustment device 420.

First, the first position adjustment device 410 may be coupled to the main frame 101 constituting the main body frame 100 in a hydraulic cylinder manner to adjust a position of the forklift folk 200.

The first position adjustment device 410 may include a first hydraulic cylinder 411, a first transfer plate 412, and a first transfer roller 413.

In addition, the first hydraulic cylinder 411 may be formed in pair vertically in the main frame in a reverse structure in which the piston rod 411a contracts downward in order to perform an elevating operation of the forklift fork 200.

A cylinder housing fixing part 411c for fixing an upper end of the cylinder housing may be formed on an upper end of the main frame 101 constituting the main body frame 100, and a rod fixing part 411d for fixing the hydraulic cylinder may be formed on the other side of the transfer plate 412, in which the cylinder housing fixing part 411c and the rod fixing part 411d may be disposed to be perpendicular to each other.

In addition, the first transfer plate 412 may vertically and linearly reciprocate along both sides of the main frame 101 while one end of the piston rod constituting the first hydraulic cylinder 411 and a part of the connection frame 103 fixed to the forklift folk 200 are fixedly coupled, and may be formed in pair.

In addition, the first transfer roller 413 is rotatably coupled to both upper and lower sides of one side surface of the first transfer plate 412 to move up and down along a vertical transfer rail 101a having a 'C' shape in a horizontal section and formed on both sides of the main frame when the piston rod 411a of the hydraulic cylinder 411 contracts. In the embodiment of the present invention, the first transfer roller has been provided in pair, but a plurality of first transfer rollers may be provided according to the weight of a supported large tire.

Next, the second position adjustment device 420 may be coupled to the sub-frame 102 constituting the main body frame 100 in a hydraulic cylinder manner in order to adjust a position of the attachment/detachment means 300.

The second position adjustment device 420 may include a second hydraulic cylinder 421, a second transfer plate 422, and a second transfer roller 423.

More specifically, the second hydraulic cylinder 421 may be formed perpendicular to the sub-frame 102 in a reverse structure in which the piston rod 421a contracts downward in order to perform an elevating operation of the attachment/detachment means 300, and may be formed in pair.

A cylinder housing fixing part 421c for fixing an upper end of the cylinder housing may be formed on an upper end of the sub-frame 102 constituting the main body frame 100, and a rod fixing part 421d for fixing the hydraulic cylinder may be formed on the other side of the transfer plate 422, in which the cylinder housing fixing part 421c and the rod fixing part 421d may be disposed to be perpendicular to each other.

In addition, the second transfer plate 422 may vertically and linearly reciprocate along both sides of the sub-frame 102 while one end of the piston rod 421a constituting the second hydraulic cylinder 412 and a part of the fixing member for supporting and fixing the attachment/detachment means 300 are fixedly coupled, and may be formed in pair.

In addition, the second transfer roller 423 is rotatably coupled to both upper and lower sides of one side surface of the second transfer plate 422 to move up and down along a vertical transfer rail 102a having a 'C' shape in a horizontal section and formed on both sides of the sub-frame when the piston rod 421a of the second hydraulic cylinder 421 contracts. The second transfer roller formed in pair in the embodiment of the present invention. However, like the first transfer roller 413, a plurality of second transfer rollers may be provided according to the weight of a supported large tire.

In addition, as shown in the drawing, the first and second hydraulic cylinders 411 and 421 may be installed with a pair of hydraulic ports 411b and 421b in adjacent portions of both ends of a cylinder housing 411 and 421 constituting the hydraulic cylinder and may be formed in a double-acting cylinder type in which an inner center of the cylinder housing is partitioned by a partition wall, so as to move up and down.

Meanwhile, in the embodiment of the present invention, the main body frame 100 as shown in FIG. 4b, may have an accelerator pedal 120 installed to protrude from a bottom of a rear end of the main body frame to accelerate the power of the driving unit, and the power of the hydraulic driving device may be additionally used when the weight of the mounted tire is increased.

Figure 5:
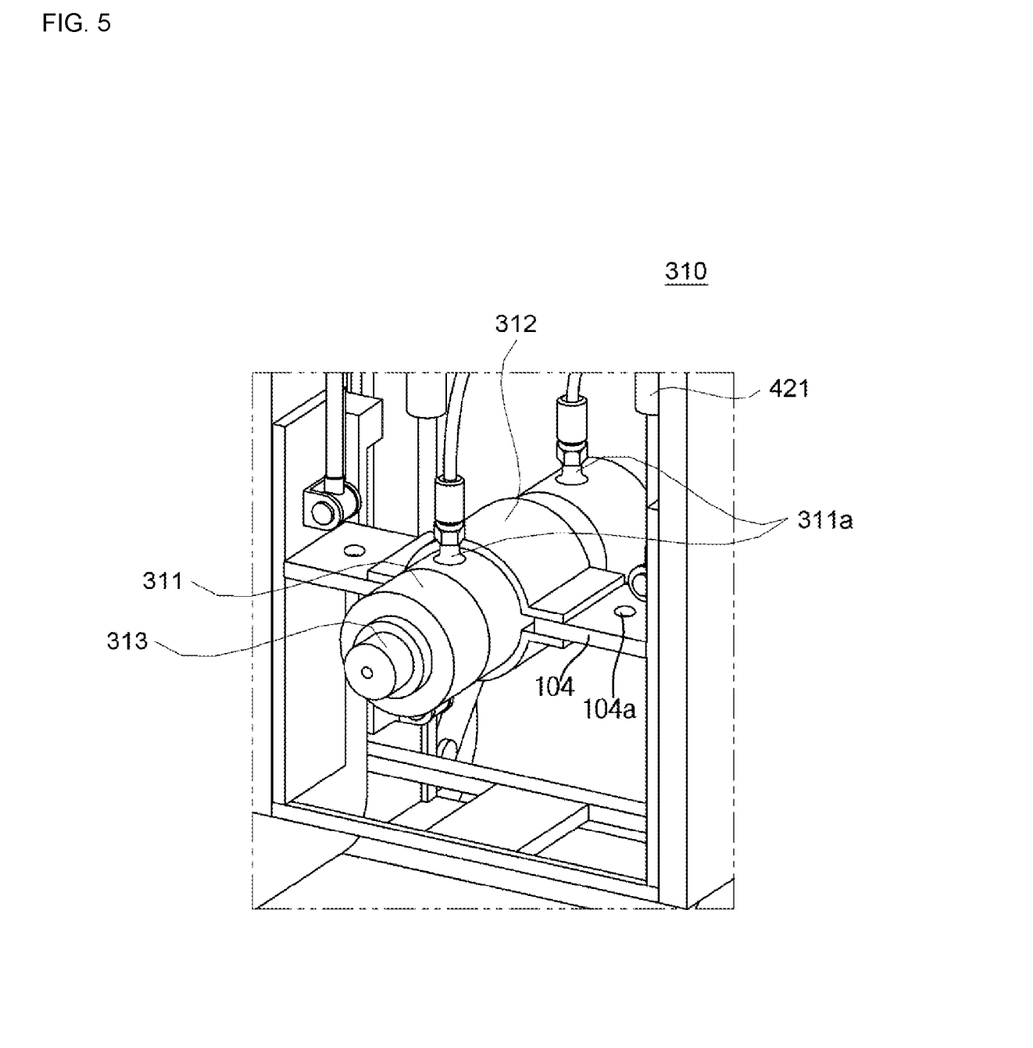
FIG. 5 is a view for explaining an attachment/detachment means according to the embodiments of the present invention.

FIG. 5 is a view for explaining the attachment/detachment means according to the embodiments of the present invention. FIG. 6 is a view for explaining a wheel fixing means constituting the attachment/detachment means according to one embodiment of the present invention.

As shown in the drawing, the attachment/detachment means 300 constituting the apparatus for attaching or detaching a commercial vehicle tire hub drum according to the embodiments of the present invention may include a wheel fixing means 301 and a press arm member 310.

More specifically, the wheel fixing means 301 may include at least two wheel vent clasps 301a to fix a tire wheel constituting a vehicle wheel.

In addition, the press arm member 310 may separate the vehicle wheel 10 fixed by the wheel fixing means 301 from the vehicle by pressing a central hub 12 of a tire wheel 11.

In addition, the sub-frame 102 may be provided therein with a fixing frame 104 for supporting and fixing the attachment/detachment means 300. In the fixing frame 104, coupling holes 104a for coupling one ends of the wheel fixing means 301 may be formed on both sides about the press arm member 310.

The press arm member 310 may include a cylindrical hydraulic press housing 311, a fixing member 312, and a piston rod 313.

More particularly, the hydraulic press housing 311 may be formed in a double-acting cylinder manner in which a pair of hydraulic ports 311a are installed in portions adjacent to both front and rear ends thereof and a partition is installed in a center thereof.

In addition, the fixing member 312 may have an end coupled to and supported by the fixing frame 104 while surrounding the hydraulic press housing 311.

In addition, the hydraulic press piston rod 313 may attach and detach the tire wheel constituting the vehicle wheel to or from the vehicle when oil is introduced through the hydraulic port 311a installed in the hydraulic press housing 311.

Figure 6:
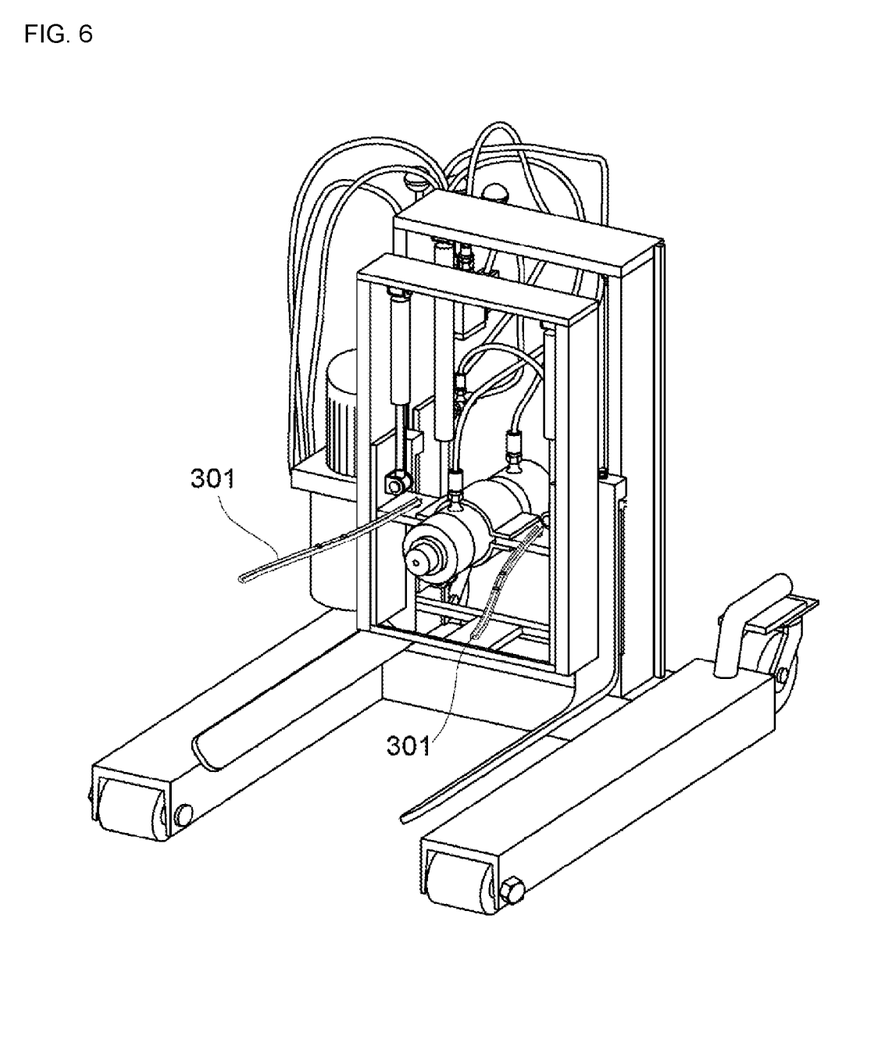
FIG. 6 is a view for explaining a wheel fixing means and a press arm member constituting the attachment/detachment means according to one embodiment of the present invention.
Figure 7:
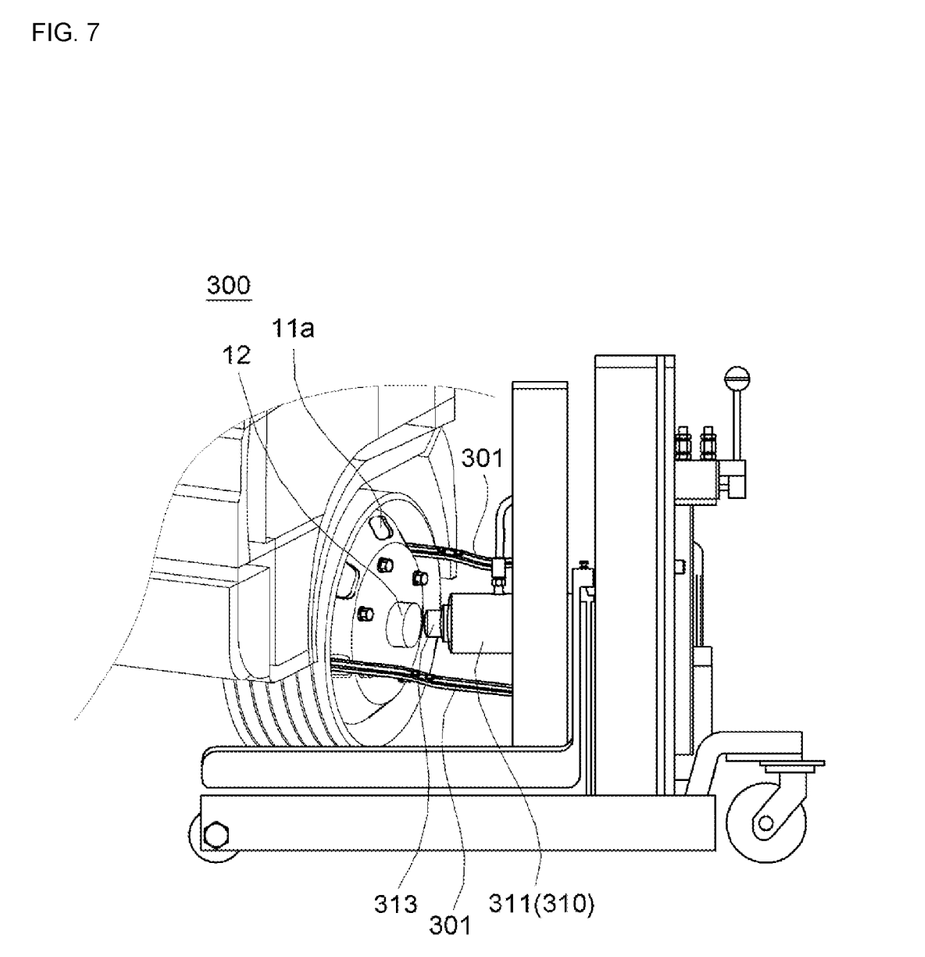
FIG. 7 is a view for explaining an example of using the wheel fixing means shown in FIG. 6 according to one embodiment of the present invention.

FIG. 7 is a view for explaining an example of using the wheel fixing means shown in FIG. 6 according to one embodiment of the present invention.

First, as described above, the main body frame 100 constituting the apparatus for attaching or detaching a commercial vehicle tire hub drum according to the embodiments of the present invention may include a main frame 101 and a sub-frame 102.

The main frame 101 may include a pair of first hydraulic cylinders 411 mounted in a reverse structure in which the piston rod 411a contracts downward, and having a bidirectional double-acting cylinder type in order to perform the lifting and lowering operation of the sub-frame 102 coupled to the forklift fork 200; a pair of first transfer plates 412 for vertically and linearly reciprocating along both sides of the main frame 101 while having a rod fixing part 411d to which one end of the piston rod 411a constituting each of the first hydraulic cylinders 411 is fixedly coupled; and a plurality of first transfer rollers 413 in-situ rotatably coupled to both upper and lower sides of one side surface of the first transfer plate 412 to move up and down along a vertical transfer rail 101a formed on both sides of the main frame 101 when the piston rod 411a of the first hydraulic cylinder 411 contracts.

In addition, the sub-frame 102 may include a pair of second hydraulic cylinders 421 mounted in a reverse structure in which the piston rod 421a contracts downward in order to perform an elevating operation of the attachment/detachment means 300, and having a bidirectional double-acting cylinder type; a pair of second transfer plates 423 for vertically and linearly reciprocating along both sides of the sub-frame 102 while one end of the piston rod 421a constituting each of the second hydraulic cylinders 412 and both ends of the fixing member 312 constituting the attachment/detachment means 300 and supporting and fixing the attachment/detachment means so as to be positioned at a center in the horizontal direction are fixedly coupled; and a plurality of second transfer rollers 423 in-situ rotatably coupled to both upper and lower sides of one side surface of the second transfer plate 423 to move up and down along a vertical transfer rail 102a formed on both sides of the sub-frame 102 when the piston rod of the second hydraulic cylinder 421 contracts.

In addition, the attachment/detachment means 300 may include a press arm member 310 having piston rods 411a and 421a that expand and contract in the horizontal direction to press or release a central hub of a tire wheel when oil is selectively introduced into the hydraulic ports 411b and 421b formed on both sides of the cylinder housings 411 and 421 having a bidirectional double-acting cylinder type; and a wheel fixing means 301 capable of coupling and fixing the tire wheels constituting the vehicle wheel so that the vehicle wheels can be separated from the vehicle when the central hub of the tire wheel is pressed using the press arm member 310.

As shown in the drawing, the wheel fixing means 301 constituting the attachment/detachment means 300 is used, so that the vehicle wheel 10 is first fixed by hooking the clasp formed at the end of the fixing means 301 onto a vent-hole 11a of the tire wheel 11 constituting the vehicle wheel 10. Thereafter, when the press arm member 310 is pressed into close contact with the central hub by using the operation lever 120, the main body frame is pushed away from the vehicle, so that the wheel of the vehicle may be easily separated.

Meanwhile, in the embodiment of the present invention, the wheel fixing means 301 is shown in the drawing as being coupled to both sides of the fixing member 312 for supporting and fixing the press arm member 310. However, the wheel fixing means may be formed in various positions of the main body frame 10 without limiting the coupled position, and may be stored or used separately depending on the working environment and coupled to perform work when needed.

Figure 8:
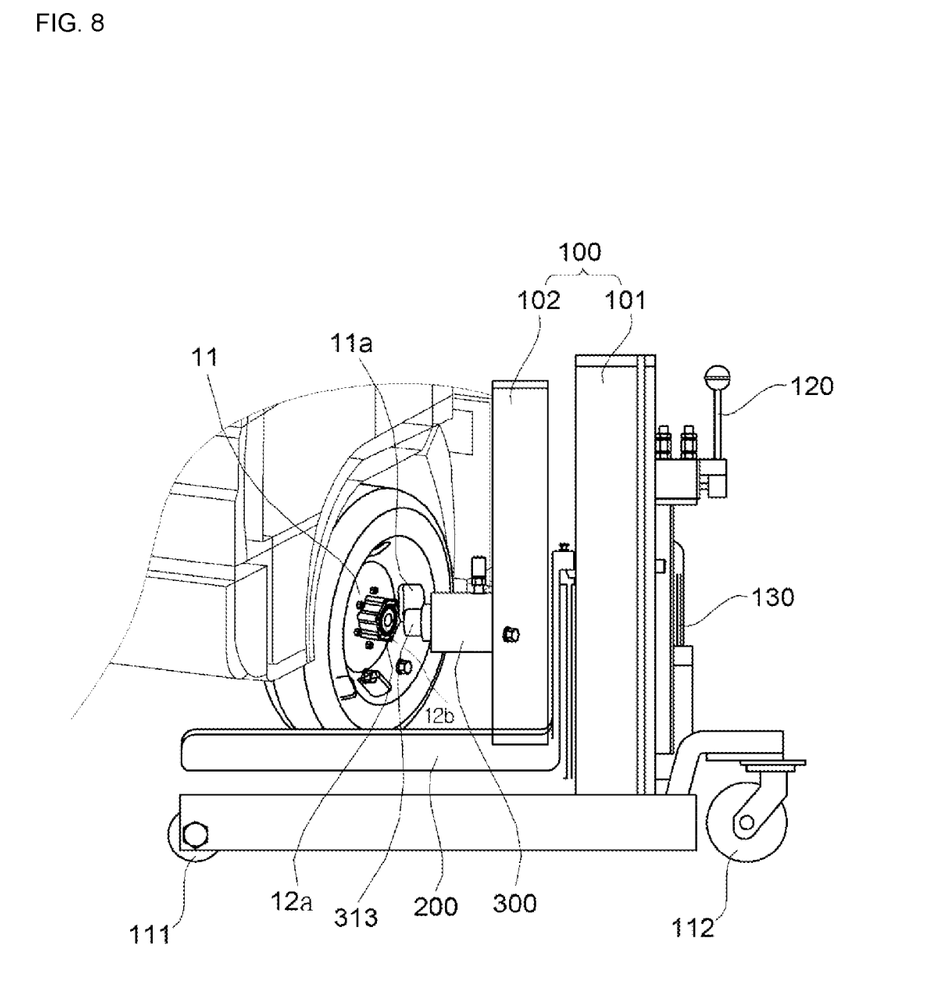
FIG. 8 is a view for explaining a method of using the apparatus for attaching or detaching a commercial vehicle tire hub drum according to the embodiments of the present invention.

FIG. 8 is a view for explaining a method of using an apparatus for attaching or detaching a commercial vehicle tire hub drum according to another embodiment of the present invention.

As shown in the drawing, the apparatus for attaching or detaching a commercial vehicle tire hub drum according to the embodiments of the present invention may insert the press arm member 310 into a hub central portion 12a constituting the hub 12 to press an inner bearing unit, after a hub cover of the central hub constituting the large tire is removed. The wheel fixing means 310 may be fixed to a housing hole 12b for coupling the hub cover of the hub housing constituting the hub 12, and the hub 12 coupled to the large tire, or the large hub 12 of the commercial vehicle in the case of removing the tire wheel may be detached together with a disk drum.

More specifically, the operation of removing the hub of the commercial vehicle tire and the drum coupled to the hub will be described. First, after the apparatus for attaching or detaching the commercial vehicle tire hub drum according to the embodiment of the present invention is transported to a short distance within the workplace by using the traveling unit 110, the forklift fork 200 installed in the main frame 101 and the attachment/detachment means 300 mounted in the sub-frame 102 may be lifted and lowered to adjust the position for attaching and detaching the hub 12. The large tire with the heavy hub coupled thereto may be easily held and fixed by using the forklift fork 200 formed inclined upward, and may be easily attached to and detached from the vehicle by using the wheel fixing means 310 and the press arm member 310 constituting the attachment/detachment means 310.

Meanwhile, as an example, FIG. 7 shows operations of attaching or detaching the large tire and the tire wheel in combination state, and FIG. 8 shows the operation of attaching or detaching the large tire of the commercial vehicle, simultaneously as a whole, in which the hub and drum are combined while the wheel cover hub cover is removed. However, the apparatus for attaching or detaching a commercial vehicle tire hub drum according to the embodiments of the present invention may detach or attach the coupled component configured by combining at least one of the commercial vehicle tire, the tire wheel, the hub, and the drum, depending on a type of required work.

In particular, since the forklift fork 200 may adjust the position by using the main frame 102 and the attachment/detachment means 300 may be dually adjusted by using the sub-frame 102, the press arm member 313 can be precisely positioned at the center of the bearing constituting the inner side of the hub while the hub cover is separated, and the position can be precisely adjusted when a heavy object, including a hub combined with a drum, is mounted on a vehicle.

Accordingly, The present invention provides the apparatus for attaching or detaching a commercial vehicle tire hub drum, which can use a hydraulic device providing a hydraulic driving force to adjust the vertical position of a load-holding means, and conveniently attach or detach a load of various sizes to a vehicle from a fixed position.

In addition, the present invention provides the apparatus for attaching or detaching a commercial vehicle tire hub drum, in which large tires as well as vehicle hubs, drums, and combinations thereof can be easily replaced, and short-distance transport can be facilitated within a workplace, so that the work efficiency can be improved.

In addition, according to the present invention, elevating heights of the forklift fork and the press arm member can be adjusted independently of each other by composing the main body frame in multiple, so that tires for large trucks of various sizes can be easily attached and detached.

In addition, the present invention provides the apparatus for attaching or detaching a commercial vehicle tire hub drum, in which the sufficient physical force can be provided to attach and detach the heavy object by using the hydraulic cylinder and the hydraulic press operated in a bidirectional double-acting cylinder type using a pair of hydraulic ports installed on both sides of the housing in the longitudinal direction, so that anyone can easily operate the apparatus without much effort.

In addition, according to the present invention, the piston rod of the hydraulic cylinder having a reverse contraction structure and installed on the main body frame is provided to contract downward, so that the minimum height for mounting the heavy object mounted on the vehicle can be easily ensured.

In addition, according to the present invention, the heavy object may be stably raised and lowered by using the structure using the transfer rollers inserted into both side surfaces of the main frame and the sub-frame constituting the main body frame and moved while coming into contact with the inner side of the frame, and a plurality of the transfer plates vertically transferred along the both side surfaces constituting the main body frame, so that the accident can be prevented.

In addition, according to the present invention, the traveling wheels mounted on the lower part of the main body frame is provided such that a pair of fixed wheels are provided in front sides so as to be difficult to change directions, and a pair of rotating wheels are provided in rear sides so as to be easily change directions, so that the direction switch can be easily performed during short-distance transport and moved while securing a proper position upon attachment and detachment in the proximity of the axle hub.

The present invention has been described in detail, but it is clear that the embodiments disclosed in the above description are illustrative only and does not limit the present invention. Any change in elements to be equivalently dealt with will fall within the scope of the present invention without departing from the technical spirit or field of the present invention provided by the following claims.

The invention claimed is:

1. An apparatus for attaching or detaching a commercial vehicle tire hub drum, the apparatus comprising:
    a main body frame;
    a holding device formed so as to face forward from the main body frame for holding upright a circular load mounted on a commercial vehicle;
    an attachment/detachment device for executing an attachment/detachment operation of the circular load from above the holding device; and
    a position adjustment device coupled to the main body frame to adjust positions of the holding device and the attachment/detachment device, the position adjustment device including a first position adjustment device and a second position adjustment device,
    wherein the main body frame includes:
        a main frame providing a moving space of the first position adjustment device for performing an elevating operation of the holding device; and at least one sub-frame providing a moving space of the second position adjustment device for performing an elevating operation of the attachment/detachment device, and having a lower side to which the holding device bent in an 'L' shape is coupled,
    wherein the main body frame further includes:
        a connection frame connected and fixed to a predetermined portion of the holding device coupled to the sub-frame and predetermined portions of the position adjustment devices for performing the elevating operation of the sub-frame.

2. The apparatus of claim 1, wherein the main body frame is formed on an upper rear surface thereof with an operation lever for controlling operations of the position adjustment device and the attachment/detachment device, and formed on a side surface thereof with a driving unit for driving the position adjustment device and the attachment/detachment device by controlling the operation lever.

3. The apparatus of claim 2, wherein the main body frame has an accelerator pedal installed to protrude from a bottom of a rear end of the main body frame to accelerate the power of the driving unit.

4. The apparatus of claim 1, wherein the sub-frame is provided therein with a fixing frame for supporting and fixing the attachment/detachment device.

5. The apparatus of claim 1, wherein the position adjustment device includes bidirectional double-acting cylinder type hydraulic cylinders vertically coupled to the main body frame in a reverse structure in which a piston contracts downward in order to adjust positions of the holding device and the attachment/detachment device.

6. The apparatus of claim 1, wherein
the first position adjustment device is coupled to the main frame constituting the main body frame in a hydraulic cylinder manner in order to adjust a position of the holding device; and
the second position adjustment device is coupled to the sub-frame constituting the main body frame in a hydraulic cylinder manner in order to adjust a position of the attachment/detachment device.

7. The apparatus of claim 1, wherein the first position adjustment device includes:
a pair of first hydraulic cylinders formed perpendicular to the main frame in a reverse structure in which a piston rod contracts downward in order to perform an elevating operation of the holding device;
a pair of first transfer plates for vertically and linearly reciprocating along both sides of the main frame while one end of the piston rod constituting the pair of first hydraulic cylinders and a part of the connection frame fixed to the holding device are fixedly coupled; and
a plurality of first transfer rollers rotatably coupled to both upper and lower sides of one side surface of each of the pair of first transfers plate to move up and down along a vertical transfer rail having a 'C' shape in a horizontal section and formed on both sides of the main frame when the piston rod of each of the pair of first hydraulic cylinders contracts.

8. The apparatus of claim 7, wherein the second position adjustment device includes:
a pair of second hydraulic cylinders formed perpendicular to the sub-frame in a reverse structure in which a piston rod contracts downward in order to perform an elevating operation of the attachment/detachment device;
a pair of second transfer plates for vertically and linearly reciprocating along both sides of the sub-frame while one end of the piston rod constituting the pair of second hydraulic cylinders and a part of a fixing member for supporting and fixing the attachment/detachment device are fixedly coupled; and
a plurality of second transfer rollers rotatably coupled to both upper and lower sides of one side surface of each of the pair of second transfer plates to move up and down along a vertical transfer rail having a 'C' shape in a horizontal section and formed on both sides of the sub-frame when the piston rod of the second hydraulic cylinder contracts.

9. The apparatus of claim 8, wherein the pair of first and second hydraulic cylinders are installed with a pair of hydraulic ports in adjacent portions of opposite ends of a cylinder housing constituting the pair of first and second hydraulic cylinders, and formed in a double-acting cylinder type in which an inner center of the cylinder housing is partitioned by a partition wall, so as to move up and down.

10. The apparatus of claim 1, wherein the attachment/detachment device includes:
a wheel fixing device having at least two wheel vent clasps for fixing a circular heavy object; and
a press arm member for separating the fixed circular heavy object from a vehicle by pressing a central hub of the circular heavy object.

11. The apparatus of claim 10, wherein the press arm member includes:
a cylindrical hydraulic press housing operated in a double-acting cylinder manner in which a pair of hydraulic ports are installed in portions adjacent to opposite front and rear ends thereof and a partition is installed in a center thereof;
a fixing member supporting and fixing the sub-frame while surrounding a periphery of the hydraulic press housing; and
a hydraulic press piston rod for attaching and detaching the circular heavy object to or from the vehicle when oil is introduced through the pair of hydraulic ports installed in the hydraulic press housing.

12. The apparatus of claim 1, wherein traveling wheels mounted on the lower part of the main body frame include a pair of fixed wheels, which are difficult to change directions, in front sides, and a pair of rotating wheels, which are easy to change directions, in rear sides.

13. The apparatus of claim 1, wherein the holding device is formed as forks for a forklift in which forks facing each other are inclined to stably hold a circular heavy object.

14. The apparatus of claim 1, wherein the main frame and the sub-frame constituting the main body frame are formed as a frame having a rectangular ring shape in order to provide a space for expansion and contraction of a piston rod constituting a hydraulic cylinder, and a size of the frame is adjustable to replace circular heavy objects of various sizes.

15. An apparatus for attaching or detaching a commercial vehicle tire hub drum to attach and detach a circular heavy object from a center of a tire wheel of a vehicle, the apparatus comprising:
a main frame formed on an upper rear surface thereof with an operation lever for controlling attachment/detachment operations, and provided on an outer side surface thereof with a hydraulic driving device for providing a hydraulic driving force under the control of the operation lever;
a sub-frame disposed in a vertical direction to enable elevating and lowering operations in front of the main frame while a holding device bent in an 'L' shape is fixedly coupled on a lower side;
an attachment/detachment device installed to move up and down at a center in the inner horizontal direction of the sub-frame to directly perform an attachment and detachment operations in close contact with a separated center of a tire wheel of the vehicle with respect to the circular heavy object; and
a traveling unit mounted on a lower part of the main frame and including a moving device for enabling short-distance movement.

16. The apparatus of claim 15, wherein the main frame includes:
a pair of first hydraulic cylinders mounted in a reverse structure in which a piston rod contracts downward in order to perform the lifting and lowering operation of the sub-frame coupled to the holding device, and having a bidirectional double-acting cylinder type;
a pair of first transfer plates for vertically and linearly reciprocating along both sides of the main frame while having a rod fixing part to which one end of the piston rod constituting each of the first hydraulic cylinders is fixedly coupled; and a plurality of first transfer rollers in-situ rotatably coupled to both upper and lower sides of one side surface of the pair of first transfer plates to move up and down along a vertical transfer rail formed on both sides of the main frame when the piston rod of the pair of first hydraulic cylinders contracts.

17. The apparatus of claim 16, wherein the sub-frame includes:
a pair of second hydraulic cylinders mounted in a reverse structure in which a piston rod contracts downward in order to perform an elevating operation of the attachment/detachment device, and having a bidirectional double-acting cylinder type;
a pair of second transfer plates for vertically and linearly reciprocating along both sides of the sub-frame while one end of the piston rod constituting each of the second hydraulic cylinders and both ends of a fixing member constituting the attachment/detachment device and supporting and fixing the attachment/detachment device so as to be positioned at a center in the horizontal direction are fixedly coupled; and
a plurality of second transfer rollers in-situ rotatably coupled to both upper and lower sides of one side surface of the pair of second transfer plates to move up and down along a vertical transfer rail formed on both sides of the sub-frame when the piston rod of the pair of second hydraulic cylinders contracts.

* * * * *